(12) United States Patent
Brady et al.

(10) Patent No.: US 7,928,393 B2
(45) Date of Patent: Apr. 19, 2011

(54) HEALTH MONITORING THROUGH A CORRELATION OF THERMAL IMAGES AND TEMPERATURE DATA

(75) Inventors: Kevin C. Brady, San Marcos, CA (US); Michael Seskin, Cardiff, CA (US); Anthony J. Grichnik, Peoria, IL (US)

(73) Assignee: Solar Turbines Inc., San Diego, CA (US)

( * ) Notice: Subject to any disclaimer, the term of this patent is extended or adjusted under 35 U.S.C. 154(b) by 89 days.

(21) Appl. No.: 12/081,370

(22) Filed: Apr. 15, 2008

(65) Prior Publication Data
US 2009/0256077 A1 Oct. 15, 2009

(51) Int. Cl.
*G01J 5/02* (2006.01)
(52) U.S. Cl. .................................. 250/341.5; 374/129
(58) Field of Classification Search ............... 250/341.5; 374/129
See application file for complete search history.

(56) References Cited

U.S. PATENT DOCUMENTS

| | | | |
|---|---|---|---|
| 4,876,453 A | 10/1989 | Wirick | |
| 5,128,884 A | 7/1992 | Prager | |
| 5,580,172 A | 12/1996 | Bhardwaj et al. | |
| 5,831,762 A | 11/1998 | Baker et al. | |
| 6,226,125 B1 | 5/2001 | Levy et al. | |
| 6,691,019 B2 | 2/2004 | Seeley et al. | |
| 6,768,102 B1 | 7/2004 | Skoll | |
| 6,875,979 B2 | 4/2005 | Cope | |
| 6,884,392 B2 | 4/2005 | Malkin et al. | |
| 7,012,716 B2 | 3/2006 | Furuya | |
| 2006/0209358 A1 | 9/2006 | Rogalski, Jr. et al. | |
| 2006/0230097 A1 | 10/2006 | Grichnik et al. | |
| 2006/0232675 A1* | 10/2006 | Chamberlain et al. | 348/164 |
| 2007/0158776 A1 | 7/2007 | Julio et al. | |

* cited by examiner

*Primary Examiner* — David P Porta
*Assistant Examiner* — Shun Lee
(74) *Attorney, Agent, or Firm* — Finnegan, Henderson, Farabow, Garrett & Dunner LLP

(57) ABSTRACT

A method of correlating thermal sensors data with temperature sensor data is disclosed. The method may include generating one or more temperature sensor data points and receiving the one or more temperature sensor data points at a remote location. The method may also include generating one or more thermal sensor data points or images and receiving the one or more thermal sensor data points or images at the remote location. Additionally, the method may include correlating the one or more thermal sensor data points or images based on the one or more temperature sensor data points and generating a notification when a temperature of one or more correlated thermal sensor data points or images fails to maintain a determined relationship with a preset limit in one or more locations other than the location of one or more temperature sensor data point.

12 Claims, 3 Drawing Sheets

HEALTH MONITORING THROUGH A CORRELATION OF THERMAL IMAGES AND TEMPERATURE DATA

TECHNICAL FIELD

The present disclosure relates generally to correlating thermal images and temperature data and, more particularly, to a method and system to correlate thermal images and temperature data.

BACKGROUND

Fixed or mobile machines may experience performance degradation over time if not periodically maintained and repaired. Often the machines are in remote locations or are expensive to remove from operation. Thus, it is desirable to keep such machines in operation as much as possible, and to minimize their downtime.

Periodic scheduled maintenance is one way to reduce downtime due to repairs, or otherwise minimize the impact on operations. However, periodic maintenance may be undesirable because the maintenance is done on a schedule, not when the maintenance is actually needed, thereby leading to excessive downtime. Another approach which reduces the downtime of a machine is to monitor the machine components, trend over time any data collected, analyze component or machine behavior, and schedule maintenance as problems arise or are anticipated. The trending and analysis may be done locally by the machine and/or may be performed at a remote location. In this manner, maintenance routines can be deferred until needed.

When monitoring machine components, accurate and complete data generally improves the diagnostics and prognostics. One deficiency in conventional monitoring and trending practices is in the use of temperature sensors. A temperature sensor can only report the temperature at its specific location, and not of the entire structure or body that is being monitored. In contrast, thermal images provide data on the entire body or structure. A thermal image shows temperature variations in a relative sense with respect to other temperatures and temperature differences between thermal intensities. Thus, it is desirable to combine temperature and thermal data to provide calibrated thermal images that allow the prediction of the temperature at all locations of the entire structure or body.

One example of a system that reports temperatures of sections of a turbine engine is disclosed in U.S. Pat. No. 6,691,019 (the '019 patent) issued to Seeley et al. on Feb. 10, 2004. Specifically, the '019 patent discloses a temperature sensor on each section of a turbine case for calibrating infrared images of the case. The '019 patent discloses a system for controlling distortion of the turbine case. The system includes obtaining a temperature distribution, which includes a plurality of infrared images of the turbine case. The '019 patent discloses a system for calibrating the infrared images using the thermal data including using a plurality of temperature sensors positioned on the turbine case to obtain thermal data. In addition, the '019 patent discloses a computer configured for modeling the thermal stresses.

Although the system of the '019 patent may help calibrate an infrared image of a turbine case, the system may still be problematic and have limited applicability. Specifically, the temperature sensors of the '019 patent are outside the turbine case, which may limit the accuracy of the data obtained by the temperatures sensors. In addition, the method and system of the '019 patent are not in real time or located at a remote monitoring facility. The '019 patent also may not allow for predictive scheduling of routine and/or emergency repairs and maintenance. Moreover, the '019 patent is limited to redesigning turbine cases or configurations and does not allow for calibration using predictive models of nonsymmetrical structures or non-turbine structures.

The disclosed method of correlating thermal sensors is directed to improvements in the existing technology.

SUMMARY

One aspect of the present disclosure relates to a method of correlating thermal sensors data with temperature sensor data. The method may include generating one or more temperature sensor data points and receiving the one or more temperature sensor data points at a remote location. The method may also include generating one or more thermal sensor data points or images and receiving the one or more thermal sensor data points or images at the remote location. Additionally, the method may include correlating the one or more thermal sensor data points or images based on the one or more temperature sensor data points and generating a notification when a temperature of one or more correlated thermal sensor data points or images fails to maintain a determined relationship with a preset limit in one or more locations other than the location of one or more temperature sensor data point.

Another aspect of the present disclosure relates to a system for remote monitoring and prognostics with correlation of thermal sensors data with temperature sensor data. The system may include one or more temperature sensors configured to generate one or more temperature sensor data points indicative of one or more non-ambient temperature sources. The system may also include one or more thermal sensors configured to generate one or more thermal sensor data points or images indicative of the one or more non-ambient temperature sources. The system may further include a remote location to receive the one or more temperature sensor data points and the one or more thermal sensor data points or images. The system may also include the remote location including a monitoring computer configured to correlate the one or more thermal sensor data points or images with the one or more temperature sensor data points and configured to generate a notification when a temperature in the one or more correlated thermal sensor data points or images fails to maintain a determined relationship with a preset limit in one or more locations other than the location of one or more temperature sensor data point.

DETAILED DESCRIPTION

Figure 1:
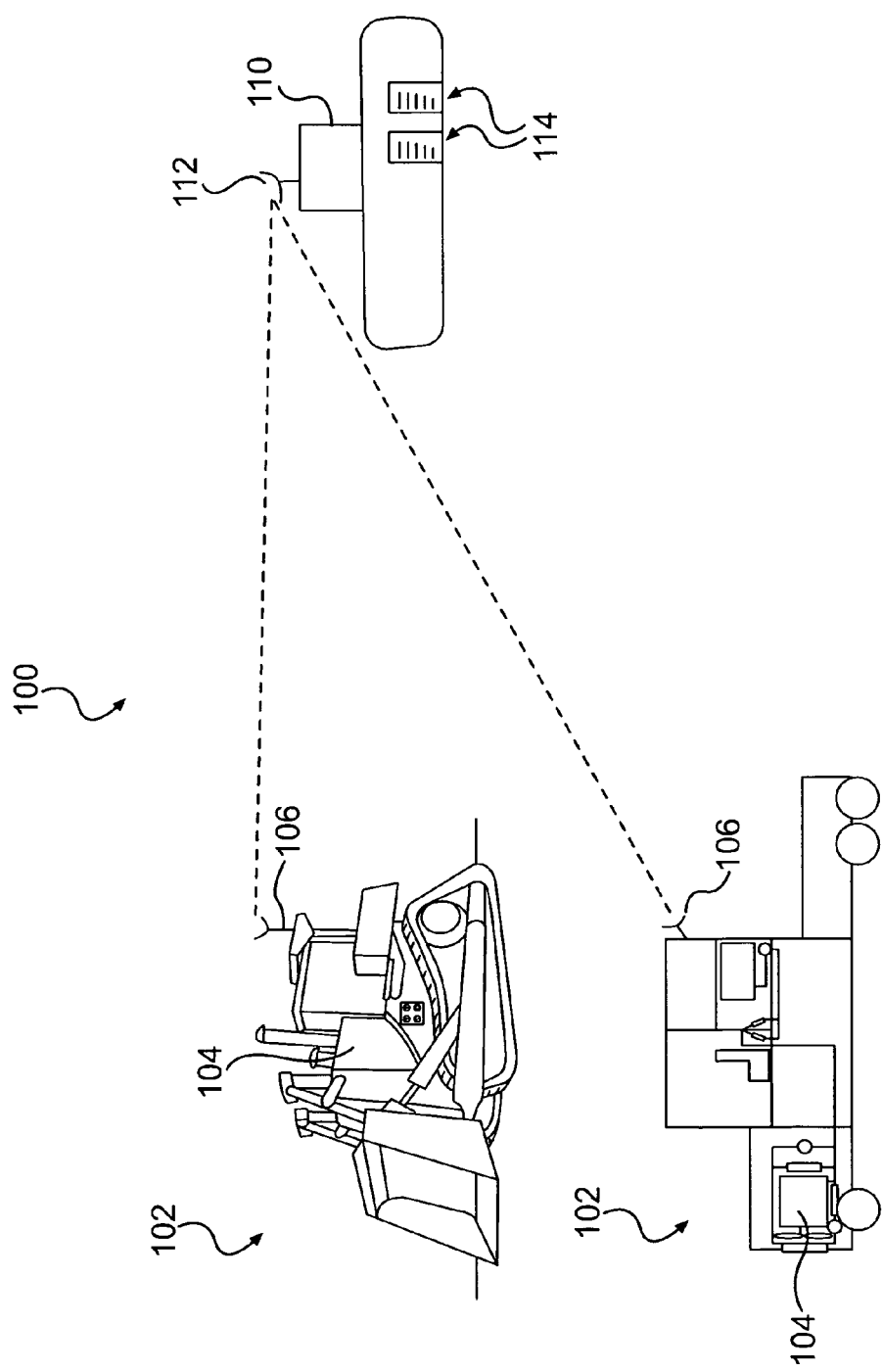
FIG. 1 is a diagrammatic illustration of a health management system, in accordance with the present disclosure.

FIG. 1 illustrates a health management system 100 in accordance with the present disclosure. Health management system 100 may include one or more machines 102 and one or more central monitoring locations 110. Health management system 100 may provide information and insight into the condition of machine 102, allowing early detection of maintenance issues. Health management system 100 may be deployed to monitor the condition of a world wide fleet of machines 102 at one or more central monitoring locations 110. For example, machine health management system 100 may monitor any system or component of a machine 102, such as the engine, tires, usage of the machine, location, hydraulics, commands issued, etc. Monitored parameters may include temperature, pressure, location data, rotation or speed, or any other parameters of interest known in the art. Parameters may be monitored with one or more sensors. The one or more sensors may be distributed on, about, or in machine 102.

Machine 102 may embody a fixed or mobile machine such as, for example, a generator, drilling platform, a crane, construction equipment, farm equipment, mining equipment, on-highway machines, etc. Machine 102 may have one or more power sources 104 and one or more remote communications devices 106.

Power source 104 may include an engine or alternate power source. Engines may include a diesel engine, a gasoline engine, a gaseous-fuel-driven engine, and a turbine engine. Alternate power sources may include hydro-electric, wind generated power, solar power, or other power sources known in the art to generate and supply power to a fixed or mobile machine. Power source 104 may produce heat, or temperature conditions different from the immediate ambient temperature surrounding power source 104.

Remote communication device 106 may be configured to send and/or receive data between machine 102 and central monitoring location 110 by any combination of wireless and/or wired communications. Exemplary remote communication devices 106 include RFID, cellular telephone, radio, satellite field set, etc.

Although not shown, machine 102 may contain one or more computing systems which may be configured to provide one or more parameters to remote communications device 106 for transmission to central monitoring location 110. The one or more computing systems may include, for example, engine control units, microprocessors, microcontrollers, etc. In one exemplary embodiment, remote communication device 106 may be configured to receive one or more parameters from one or more sensors distributed in machine 102 and send the one or more parameters to central monitoring location 110.

Central monitoring location 110 may be any location that monitors and analyzes the health and status of machines 102. Central monitoring location 110 may be located at a worksite, or may be remotely located from one or all machines 102. Central monitoring location 110 may be assigned to monitor a subset of all machines 102 able to communicate with it, may be part of a redundant network of central monitoring locations 110, or may be a single central monitoring location 110 responsible for monitoring all machines 102 capable of communicating with it. Central monitoring location 110 may include one or more central communications devices 112 and one or more monitoring computers 114.

Central communications device 112 may receive the transmissions from remote communications devices 106. The transmissions may include parameters or other information requested by or intended for central monitoring location 110. Central monitoring location 110 may use central communications device 112 to send information, warnings, commands, or queries for parameter data to machine 102 via remote communications device 106. Remote communications device 106, central communications device 112, and methods of transferring data between them are well known in the art and need not be discussed further.

Monitoring computer 114 may include at least one central processing unit (CPU) configured to execute computer program instructions to perform various processes and methods, random access memory (RAM) and read only memory (ROM) configured to access and store information and computer program instructions, memory to store data and information, one or more databases to store tables, lists, or other data structures, one or more input/output (I/O) devices, one or more interfaces, etc. The components of a monitoring computer 114 are well known in the art and need not be discussed further.

Monitoring computer 114 may perform a number of different processes. For example, monitoring computer 114 may correlate thermal sensor data points or images with temperature sensor data points and store raw parameters and any results of processes. Monitoring computer 114 may also be able to process parameters sent from one or more machines 102. Parameters may be sent by wireless or wired systems. Parameters may be different for each machine 102 reporting back to central monitoring location 110. On receipt of parameters by monitoring computer 114, a copy of the parameters may be stored for later use or comparison. In one exemplary embodiment, monitoring computer 114 may also transmit via central communications device 112 a request for the status of a machine 102 or request machine 102 to start or continue to send parameters to central monitoring location 110. In a further exemplary embodiment, the results of diagnostics and prognostics may trigger monitoring computer 114 to transmit via central communications device a notification to operator of machines 102.

Monitoring computer 114 may perform comparative prognostic processes. Comparative prognostic processes may include comparing current parameters or values calculated from one or more parameters with historical data stored by monitoring computer 114, or other storage means. Comparative prognostics may include reporting or recording any variations between the current parameters or values calculated from one or more parameters and historical data, or comparing the current parameters or values calculated from one or more parameters with preset limits. Applying preset limits may include that the new parameter or values calculated from one or more parameters maintain a determined relationship with the limit or maintain a determined rate of change over time.

Monitoring computers 114 may be configured to receive parameter data sent from one or more machines 102 and may be configured to store records of parameter data. Monitoring computers 114 may perform trending of parameter data and may perform analysis of parameters. Monitoring computers 114 may compare and correlate different parameters. Monitoring computers 114 may monitor parameters and any generated results for sudden changes compared to previous results or if the parameter or generated result exceeded a predefined limit.

Figure 2:
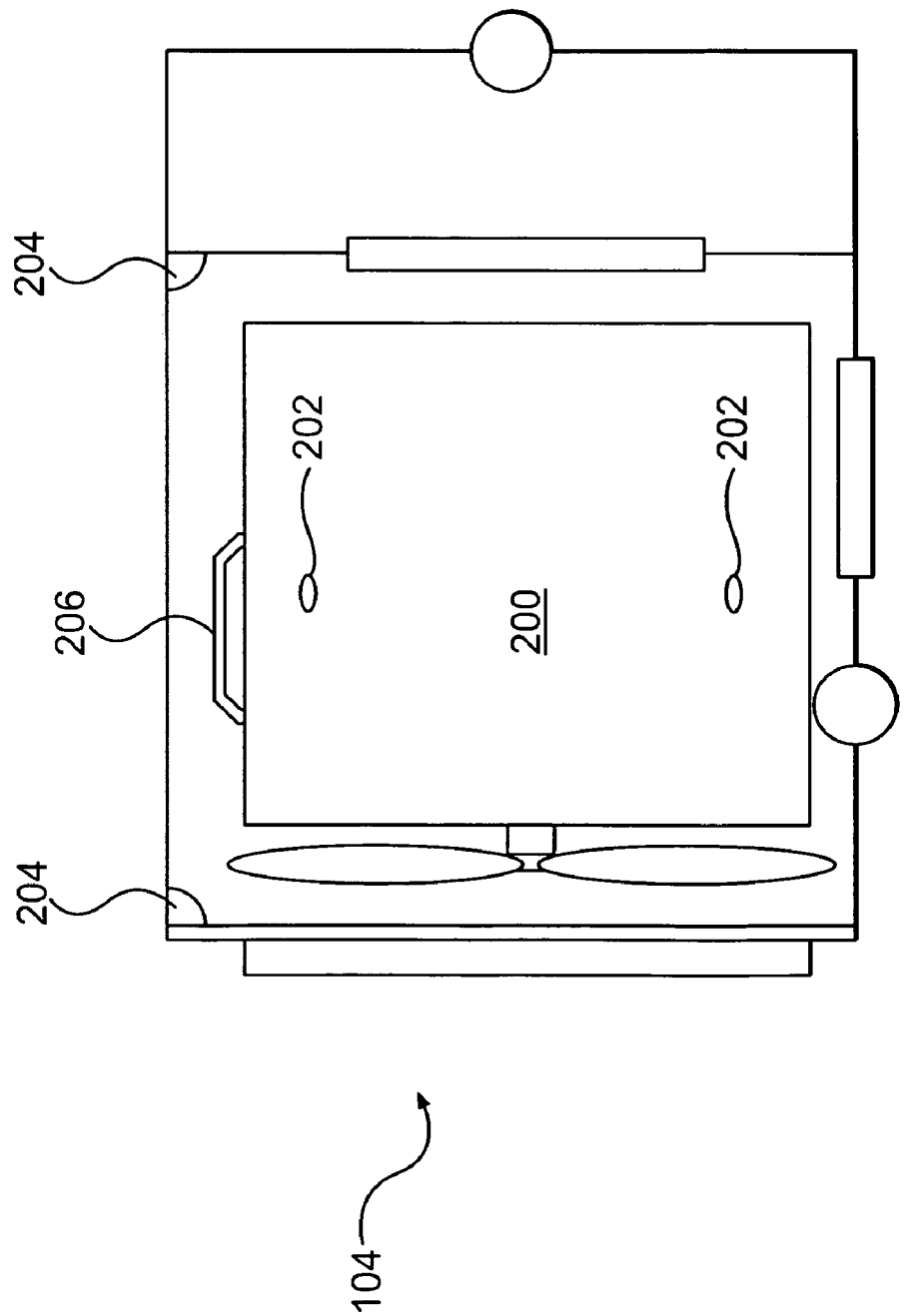
FIG. 2 is a diagrammatic illustration of an exemplary non-ambient temperature source, in accordance with the present disclosure.

FIG. 2 illustrates a power source 104 in which systems and methods consistent with the present disclosure may be implemented. As shown in FIG. 2, power source 104 may include a non-ambient temperature source 200, one or more temperature sensors 202, one or more thermal sensors 204, and one or more markers 206. Although FIG. 2 illustrates the non-ambient temperature source 200 in a power source 104, the non-ambient temperature source 200 may be within, for example, a temperature control system, a traction system, or any other system which may generate non-ambient temperatures.

Non-ambient temperature sources 200 may be a power source 104, or other source of non-ambient heating or cooling. Exemplary sources of non-ambient heating may be an exhaust system, drills or other devices subject to friction, brakes, batteries, computers or other electronic components. Exemplary sources of non-ambient cooling could be an air conditioning system, cooling system for a computer or other electronics (RF HPA cooling system), refrigerant or other liquid lines, etc.

Non-ambient temperature sources 200 may have one or more temperature sensors 202 attached on or deployed in non-ambient temperature sources 200. Temperature sensors 202 may embody, for example, thermocouples, thermal resistors, or other temperature sensors configured to generate a signal indicative of a sensed temperature or a difference between the sensed temperature and a reference temperature. Temperature sensors are well known in the art and are not further described. A temperature sensor 202 may provide one or more temperature sensor data points. Each temperature sensor data point may provide the temperature at a specific point, outside or inside of non-ambient temperature sources 200, depending on the location of temperature sensor 202.

Thermal sensors 204 may be positioned to generate thermal sensor data points or images of non-ambient temperature sources 200 and the environment immediately surrounding non-ambient temperature sources 200. In one exemplary embodiment, more than one thermal sensor may be positioned around non-ambient temperature sources 200 to create three-dimensional representations of non-ambient temperature sources 200. Thermal sensors 204 may include thermal or infrared cameras, or other sensors known in the art to develop a thermal image of an object. Thermal sensor 204 may be a separate device from temperature sensor 202. Thermal sensors 204 may provide relative temperature variations with respect to other temperatures and temperature differences between thermal intensities. Thermal sensors 204 does not provide a temperature at any specific point. Thermal sensors are well known in the art and are not further described.

Non-ambient temperature sources 200 may include markers 206, or may use any other thermally distinct feature of non-ambient temperature sources 200 as a marker 206. Markers 206 may serve as a frame of reference to align the temperature sensor data points and thermal sensor data points or images. Thus, for example, a marker 206 may be any thermally distinct shape with a known position or known distance from or relationship with a temperature sensor 202. Examples of markers 206 may be exhaust pipes, a thermal source, a fluorescing material or paint that thermal sensor 206 can detect, or any other markers known in the art. Markers 206 may have thermally sharp edges. In one exemplary embodiment, a marker 206 may allow the thermal sensor data points or images to be aligned with temperature sensor data points. In another exemplary embodiment, thermal sensor 204 may detect marker 206 and adjust its field of observation based on the position of marker 206. In an alternate exemplary embodiment, thermal sensors 204 may be attached and/or designed to not move, and temperature sensor 202 location may be known in relation to thermal sensor data points or images. Marker 206 may be omitted in the correlation process when the temperature sensor 202 location may be known in relation to thermal sensor data points or images.

Non-ambient temperature source 200 may also include one or more sensors to determine the ambient temperature near non-ambient temperature source 200. Determining the ambient temperature, and devices to determine the ambient temperature at a location, are well known in the art and need not be further discussed.

Figure 3:
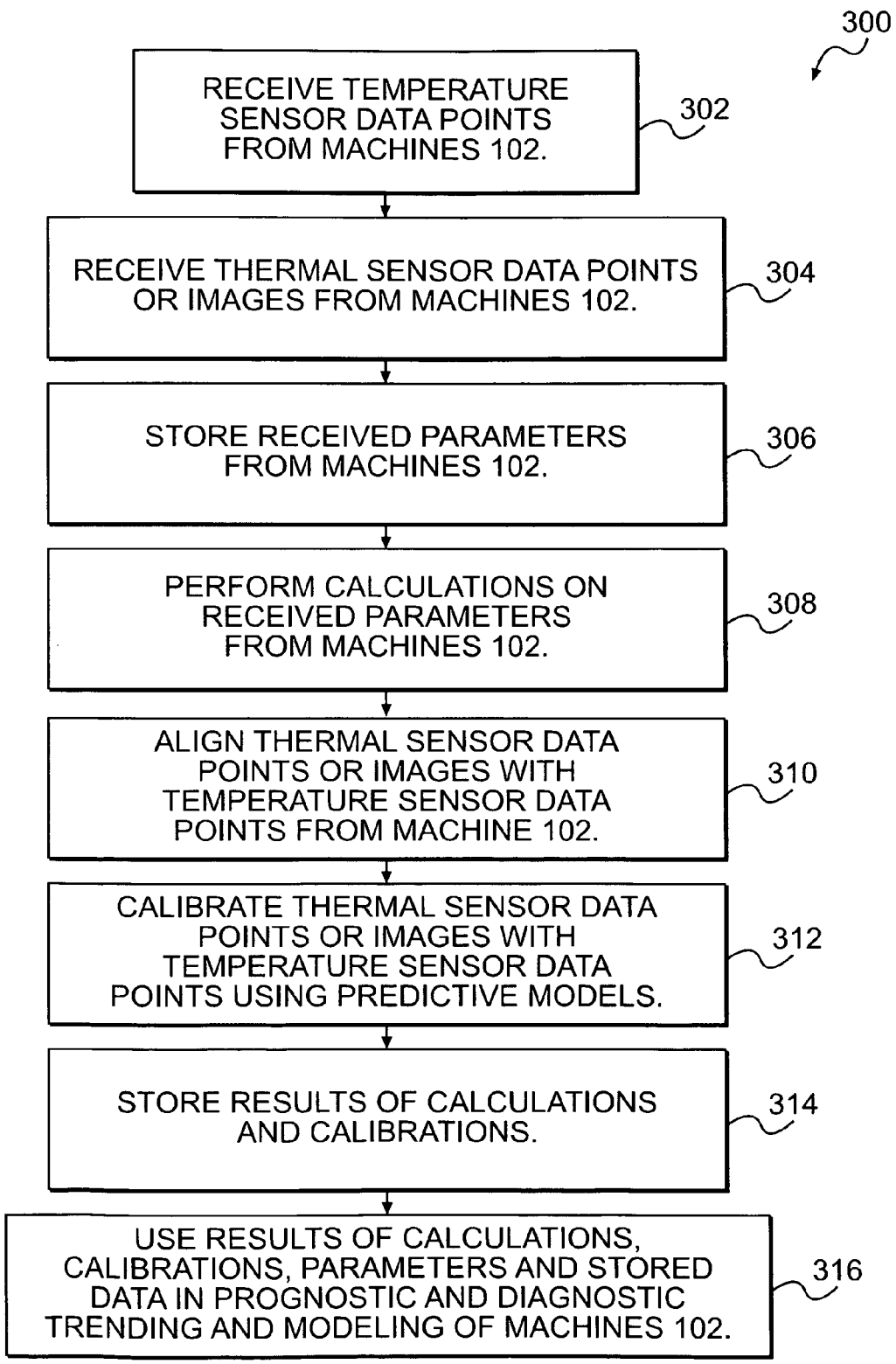
FIG. 3 is a flow chart illustrating an exemplary system for remote monitoring and prognostics with correlation of thermal sensor data with temperature sensor data, consistent with certain disclosed embodiments.

FIG. 3 shows an exemplary flow chart 300 of the steps to correlate a thermal image by using temperature sensors. The exemplary flow chart 300 should be understood to represent one possible set of steps in accordance with this disclosure. In an exemplary embodiment, monitoring computer 114 may include processes to receive parameters sent from machine 102 and processes to poll machine 102 for parameters or status. Further processes may include generating comparative prognostics on received parameters, performing calculations on received parameters, and modeling non-ambient temperature sources 200.

In step 302, monitoring computer 114 may receive temperature sensor data points from machines 102. In one exemplary embodiment, machines 102 may send the temperature sensor data points automatically or on a set schedule. In another exemplary embodiment, monitoring computer 114 may poll or request machines 102 to send temperature sensor data points to monitoring computer 114.

In step 304, monitoring computer 114 may receive thermal sensor data points or images from machines 102. In one exemplary embodiment, machines 102 may send the thermal sensor data points or images automatically or on a set schedule. In another exemplary embodiment, monitoring computer 114 may poll or request machines 102 to send thermal sensor data points or images to monitoring computer 114.

In step 306, monitoring computer 114 may store received parameters from machines 102. Monitoring computer 114 may store received parameters, or forward the received parameters to a separate storage device at central monitoring location 110, or a storage device at another location.

In step 308, monitoring computer 114 may perform calculations on received parameters to generate information relating to machine 102. Calculations may be performed on a single parameter, or may include multiple parameters. Calculations may include well known relationships, or be specific to particular machines 102 or class of machines 102. Calculations may extract information from the received parameters about the state of health of machines 102. In one exemplary embodiment, calculations may include transforming a temperature sensor data point taken inside non-ambient temperature sources 200 to a point outside or on the surface of non-ambient temperature sources 200. In further exemplary embodiments, the temperature sensor data points may be transformed from the outside to the inside of non-ambient temperature source 200. Thermal images are taken on the outside of non-ambient temperature sources 200, and to correlate thermal sensor data points or images with temperature sensor data points, the frame of reference may have to be normalized. Transformation of temperature sensor data may account for effects of the ambient temperature around non-ambient temperature source 200.

In step 310, monitoring computer 114 may align thermal sensor data points or images with temperature sensor data points. Alignment through use of markers 206, thermally distinct features of non-ambient temperature sources 200, or a fixed known relationship between temperature sensor 202 and thermal sensors 204 may allow distinct thermal sensor data points or images and temperature sensor data points to be determined as corresponding to the same location in machine 102.

In step 312, monitoring computer 114 may correlate the thermal sensor data points or images with temperature sensor data points. In one exemplary embodiment, temperature sensor 202 readings may be transformed to outside non-ambient temperature source 200 temperatures, and the intensity of the thermal sensor data point or images may be correlated by setting an intensity of the thermal sensor data or image at the location of the temperature sensor 202 equal to the temperature sensor data point at that location. In another exemplary embodiment, the intensity of the thermal sensor data points or images may be correlated by setting an intensity of the thermal sensor data or image at the location of the temperature sensor 202 equal to the temperature sensor data point at that location. All thermal sensor data points or images of equal intensity may be equal. If two temperature sensor data points correspond to thermal sensor data of the same intensity, but the temperature sensor data points are different, various predictive models may be used to integrate the thermal sensor data and temperature sensor data. One such predictive model may be assigning temperatures to intensities from each temperature sensor 202, averaging the difference between two temperature sensor data points, using an error detection routine, etc. Sliding scales between two temperature sensor data points corresponding to different intensities may be used to correlate other thermal sensor data points or parts of the image. The various predictive models may allow a temperature to be assigned to every thermal sensor data point. In a further embodiment, the ambient temperature may be included in the predictive models to further refine the correlation of the thermal sensor data points or images with temperature sensor data points.

In step 314, the results of calculations, trending, correlation, and any other manipulations of parameters may be stored for later reference in any other process run by monitoring computer 114 or be available for access by other computers or processes, or other central monitoring locations 110.

In step 316, monitoring computer 114 may perform comparative prognostic processes. Comparative prognostic processes may include comparing current parameters or values calculated from one or more parameters with historical data stored by monitoring computer 114, or other storage means. Comparative prognostics may include reporting or recording any variations between the current parameters or values calculated from one or more parameters and historical data, or comparing the current parameters or values calculated from one or more parameters with preset limits. Applying preset limits may include that the new parameter or values calculated from one or more parameters maintains a determined relationship with the limit or maintains a determined rate of change over time. Results of comparative prognostics may be stored for later use or comparison, reported to machines 102, or reported to other locations, such as, for example, the owner of machine 102, a maintenance facility, or a location responsible for monitoring the status of machines 102, including central monitoring location 110. The results of comparative prognostics also may be reported as an alert to machines 102, or reported as an alert to other locations, such as, for example, the owner of machine 102, a maintenance facility, or a location responsible for monitoring the status of machines 102, including central monitoring location 110.

Machine 102 collection of parameters, transmission by remote communication device 106 to central communication device 112 at central monitoring location 110, and any processing, trending, analysis, calculations, trending against past data, and storage by monitoring computer 114 may be done in real time. Real time may be transmission time, and a reasonable processing time, usually less then 10 seconds.

INDUSTRIAL APPLICABILITY

The disclosed embodiments may be applicable to any remote equipment or machines 102 including a non-ambient temperature source 200, such as, for example, a generator, drilling platform, a crane, construction equipment, farm equipment, mining equipment, on-highway machines, etc. Health management system 100 may allow a reduction in operation and maintenance costs while extending machine 102 life. A number of benefits may result from health management systems 100. For example, monitoring the condition of machines 102, and scheduling maintenance when needed, and not on a fixed schedule, may reduce maintenance costs and expected and unexpected down time for machines 102, and may increase the useful life of machines 102. As another example, by detecting, when they first occur, anomalous behavior or conditions that may lead to a catastrophic failure of machines 102, may reduce maintenance costs, expected and unexpected down time for machines 102, and may increase the useful life of machines 102. It may be desirable to monitor the entire temperature of a non-ambient temperature source 200, and using temperature sensors 202 to correlate thermal sensors 204 may allow the entire thermal characteristics of a non-ambient temperature source 200 to be monitored according to temperature. The monitoring may take place at central monitoring location 110.

Central monitoring location 110 maintains records and performs trending and analysis on all machines 102 assigned to central monitoring location 110. A centralized monitoring plan allows planning of maintenance activities, coordination of supplies, and centralized planning, all reducing costs and improving responsiveness. Because the monitoring is done in real time, even quickly deteriorating conditions on machines 102 may be detected and an alert sent before irreparable damage is done, even on machines 102 which are remote or autonomously operated. Preventing catastrophic failures that may require expensive replacements or cause significant downtime may represent substantial savings to owners and operators of machines 102. To improve the quality of the monitoring, more data may be helpful, such as correlating thermal sensor data points and images with temperature sensor data points.

Correlating thermal sensor data points and images with temperature sensor data points allows the temperature at any location on the structure of non-ambient temperature source 200 to be monitored. Non-ambient temperature source 200 could be an engine, turbine, exhaust pipes, fluid lines, frictional heat sources like brakes, etc. Non-ambient temperature source 200 may have a structure where a temperature sensor 202 may not detect all anomalous temperature readings anywhere in non-ambient temperature source 200. By correlating the thermal sensor data points and images with temperature sensor data points, the monitoring computer 114 may detect anomalous conditions a temperature sensor 202 may miss.

It will be apparent to those skilled in the art that various modifications and variations can be made to the disclosed thermal imaging and temperature sensor system. Other embodiments will be apparent to those skilled in the art from consideration of the specification and practice of the disclosed thermal imaging and temperature sensor system. It is intended that the specification and examples be considered as exemplary only, with a true scope being indicated by the following claims.

What is claimed is:

1. A method for monitoring the health of a fleet of remotely-located machines, comprising:
providing a health management computing system configured to monitor the health of the fleet of machines;
receiving, at the health management computing system, temperature sensor data transmitted from at least one machine in the fleet, the temperature sensor data including one or more temperature sensor data points associated with a component of the at least one machine and collected by one or more temperature sensors aboard the at least one machine;

receiving, at the health management computing system, thermal image data transmitted from the at least one machine, the thermal image data including one or more thermal images associated with the component of the at least one machine and collected by one or more thermal image sensors aboard the at least one machine;

aligning, by the health management computing system, the thermal image data with the temperature sensor data;

correlating, by the health management computing system, the aligned thermal image data based on the temperature sensor data; and generating, by the health management computing system, a notification when at least a portion of the correlated thermal data fails to maintain a determined relationship with respect to the temperature sensor data.

2. The method of claim 1, wherein the correlating is in real-time.

3. The method of claim 2, wherein correlating further includes applying predictive models to correlate the thermal image data and the temperature sensor data.

4. The method of claim 1, wherein the temperature sensor data includes one or more temperature sensor data points inside the component of the at least one machine.

5. The method of claim 1, further including utilizing, by the health management computing system, the correlated thermal image data in a comparative prognostic process.

6. The method of claim 1, wherein the one or more temperature sensor data points and the one or more thermal images include one or more data points below an ambient temperature.

7. The method of claim 1, wherein correlating includes correlating the thermal data as a function of ambient temperature.

8. The method of claim 1, wherein aligning includes:
identifying, by the health management computing system using the thermal image data, a thermally-distinct feature of the component, the thermally-distinct feature having a known position with respect to the one or more temperature sensors; and
aligning, by the health management computing system, the thermal image data with the temperature sensor data based on the known position of the thermally-distinct feature with respect to the one or more temperature sensors.

9. A method for monitoring the health of a fleet of remotely-located machines, comprising:
providing a health management computing system configured to monitor the health of the fleet of machines;
receiving, at the health management computing system, temperature sensor data transmitted from the machines in the fleet, the temperature sensor data including temperature sensor data points associated with components of the machines in the fleet and collected by temperature sensors aboard the machines in the fleet;
receiving, at the health management computing system, thermal image data transmitted from the machines in the fleet, the thermal image data including thermal images associated with the components of the machines in the fleet and collected by thermal image sensors aboard the machines in the fleet;
aligning, by the health management computing system, the thermal image data with the temperature sensor data;
correlating, by the health management computing system, the aligned thermal image data based on the temperature sensor data;
comparing, by the health management computing system, the correlated thermal image data to historical thermal image data associated with the fleet of machines to determine whether maintenance of the fleet of machines is required; and
generating, by the health management computing system, a notification when it is determined that fleet maintenance is required.

10. The method of claim 9, wherein aligning includes:
identifying, by the health management computing system using the thermal image data, thermally-distinct features of the components, the thermally-distinct features having known positions with respect to the temperature sensors; and
aligning, by the health management computing system, the thermal image data with the temperature sensor data based on the known positions of the thermally-distinct features with respect to the temperature sensors.

11. A method for monitoring the health of a fleet of machines, comprising:
providing a health management computing system configured to monitor the health of the fleet of machines;
receiving, at the health management computing system, temperature sensor data transmitted from the machines in the fleet, the temperature sensor data including temperature sensor data points associated with components of the machines in the fleet and collected by temperature sensors aboard the machines in the fleet;
receiving, at the health management computing system, thermal image data transmitted from the machines in the fleet, the thermal image data including thermal images associated with the components of the machines in the fleet and collected by thermal image sensors aboard the machines in the fleet;
aligning, by the health management computing system, the thermal image data with the temperature sensor data;
correlating, by the health management computing system, the aligned thermal image data based on the temperature sensor data;
comparing, by the health management computing system, the correlated thermal image data to historical thermal image data associated with the fleet of machines to identify a machine in the fleet requiring maintenance; and
sending, by the health management computing system, a notification to the identified machine in the fleet.

12. The method of claim 11, wherein aligning includes:
identifying, by the health management computing system using the thermal image data, thermally-distinct features of the components, the thermally-distinct features having known positions with respect to the temperature sensors; and
aligning, by the health management computing system, the thermal image data with the temperature sensor data based on the known positions of the thermally-distinct features with respect to the temperature sensors.

* * * * *